US005831533A

United States Patent [19]

Kanno

[11] Patent Number: 5,831,533

[45] Date of Patent: Nov. 3, 1998

[54] ENTERING/LEAVING CONTROL SYSTEM

[75] Inventor: Maiko Kanno, Kanagawa-ken, Japan

[73] Assignee: Kabushiki Kaisha Toshiba, Kawasaki, Japan

[21] Appl. No.: 583,464

[22] Filed: Jan. 5, 1996

[30] Foreign Application Priority Data

Mar. 17, 1995 [JP] Japan .................................... 7-058594

[51] Int. Cl.[6] ........................................................ H04Q 9/00

[52] U.S. Cl. .................... 340/573; 340/528; 340/825.31; 340/825.34; 340/825.54; 340/572

[58] Field of Search ......................... 340/825.54, 825.31, 340/825.32, 825.34, 527, 528, 573, 572

[56] References Cited

U.S. PATENT DOCUMENTS

| | | | |
|---|---|---|---|
| 5,471,203 | 11/1995 | Sasaki et al. | 340/572 |
| 5,541,585 | 7/1996 | Duhame | 340/572 |

*Primary Examiner*—Jeffery Hofsass
*Assistant Examiner*—Edward Lefkowitz
*Attorney, Agent, or Firm*—Cushman, Darby & Cushman IP Group of Pillsbury, Madison & Sutro LLP

[57] ABSTRACT

An entering/leaving control system for a user who is carrying a wireless medium which stores at least collating information and has a wireless communication function. The entering/leaving control system includes a receiving unit provided near a gate for entering/leaving a specified place. The receiving unit receives the collating information transmitted from the wireless medium. A collating unit collates the collating information received by the receiving unit with preset collating information. An intention detecting unit detects a specified place entering/leaving intention of a user who is carrying the wireless medium. A judging unit judges entering/leaving authorization to enter or leave the specified place based on the output of a collation intention detecting unit and the result of the collating unit. A control unit controls the opening/closing of the gate based on the output of the judging unit.

21 Claims, 8 Drawing Sheets

ENTERING/LEAVING CONTROL SYSTEM

BACKGROUND OF THE INVENTION

1. Field of the Invention

The present invention relates to a non-touch entering/leaving control system which controls entering/leaving of a room or place requiring security for instances using such wireless media as wireless cards, etc.

2. Description of the Related Art

In view of the importance of ensuring security of enterprises in an information oriented society, various room entering/leaving control systems have been developed in recent years.

One such entering/leaving control system uses a wireless individual identification card (hereinafter referred to as a wireless card). This non-touch entering/leaving control system allows only users (entering/leaving persons), who are carrying a wireless card storing an identification code, to enter into/leave a room or place.

That is, when a user comes close to a door (a gate), terminal equipment provided in the vicinity of the door reads an identification code from a wireless card carried by the user and collates it with the identification code that has been registered in advance, opening the door to allow the user to pass through when both the identification code from the wireless card and the identification code that has been registered in advance agree.

However, in such an entering/leaving control system, the terminal equipment which exchanges signals with wireless cards is influence by all wireless cards in a nearby vicinity regardless of whether the user has an intention of entering/leaving. That is, the terminal equipment reads all of the wireless cards carried by persons who pass near it and therefore, there is a problem such that the door (the gate) is opened although there is no person with an intention or a purpose to enter into or leave a room.

SUMMARY OF THE INVENTION

It is an object of the present invention to provide an entering/leaving control system which is capable of preventing unnecessary gate control resulting from reading information from wireless cards carried by persons with no intention to enter into/leave a specified place.

The present invention provides an entering/leaving control system for a user who is carrying a wireless medium which stores at least collating information and which has a wireless communication function, comprising means, provided near a gate for entering/leaving a specified place, for receiving the collating information sent from the wireless medium; intention detecting means for detecting the presence of the input for indicating an intention of a user who is carrying the wireless medium to enter/leave the specified place; means for collating the information received by the receiving means with a preset collating information and; judging an entering/leaving authorization to enter/leave a judgung specified place based on the output of the intention detecting means and the result of the collating means; and means for controlling the opening and closing of the gate based on the result of the judging means.

DETAILED DESCRIPTION OF THE PREFERRED EMBODIMENTS

An entering/leaving control system of the present invention will be described with reference to the attached drawings in the following.

First, a first embodiment of the present invention will be described.

Figure 1:
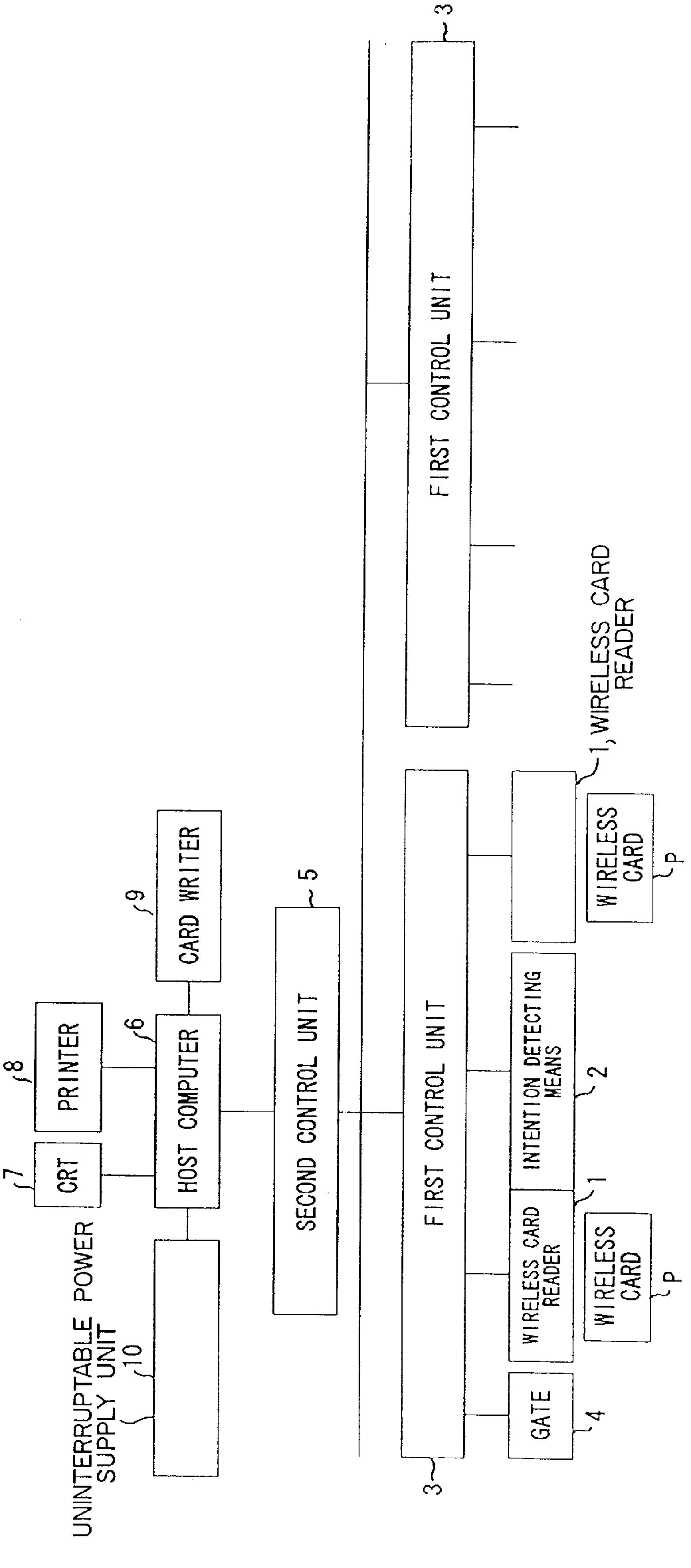
FIG. 1 is a schematic block diagram showing the construction of a first embodiment of an entering/leaving control system of the present invention.

FIG. 1 is a block diagram schematically showing a non-touch entering/leaving system involved in the first embodiment. In FIG. 1, the reference letter P shows a wireless card (a non-touch card) as a wireless medium carried by users. The wireless card has a wireless communication function, a memory as a storage means, and an antenna. For instance, the wireless card is comprised of an IC card, etc. The memory stores such collating information peculiar to the wireless card such as an identification code including an individual identification number and other security information (name of card carrier, the validity period of the card, allowed entering/leaving time, allowed entering/leaving place, etc.). The wireless card P is activated when it comes into a reading range (a communication range) of a wireless card reader 1, and transmits a prescribed radio wave and sends security information such as an identification code.

The wireless card reader (the non-touch card reader) 1 as terminal equipment is constantly transmitting a radio wave for reading wireless cards, and if a wireless card P comes into its reading range, the wireless card reader activates that wireless card P and receives (reads) security information such as the identification code, etc.

An intention detecting means 2 is to detect an intention of a user carrying a wireless card P for a room or a specified place and is provided to the wireless card reader 1 or in the vicinity of the wireless card reader.

The wireless card reader 1, the intention detecting means 2, an electrically controllable gate (a controlled door such as a door with an electric lock or an automatic door) 4 have been connected to a first control unit 3. This first control unit 3 receives card information from the wireless card reader 1, judges an entering/leaving authorization the room by collating the received card information with pre-registered collating information and controling the gate 4 according to the judgment result.

A second control unit 5 arranges room entering/leaving data received from plural first control units 3 and sends them to a host computer 6. The host computer 6 has room entering/leaving data, indicates abnormal data, performs control data and registered data preparation, and changing, retrieving and output functions.

A CRT 7, a printer 8, a card writer 9 and an uninterruptable power supply unit 10 are connected to the host computer 6. The card writer 9 is a machine to issue a new wireless card P by writing collating information including an identification code on an unwritten wireless card P.

Figure 2:
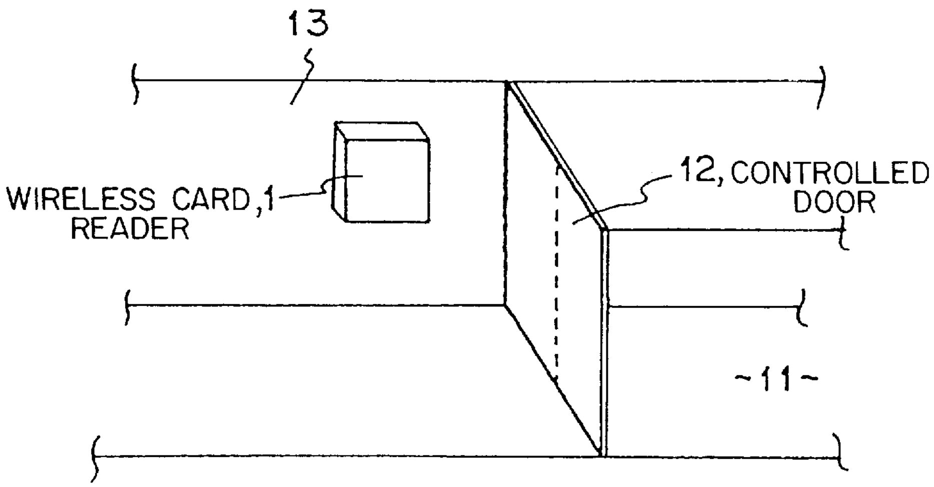
FIG. 2 is a perspective view showing a layout example of a wireless card reader near a door of which opening/closing is controlled.
Figure 3:
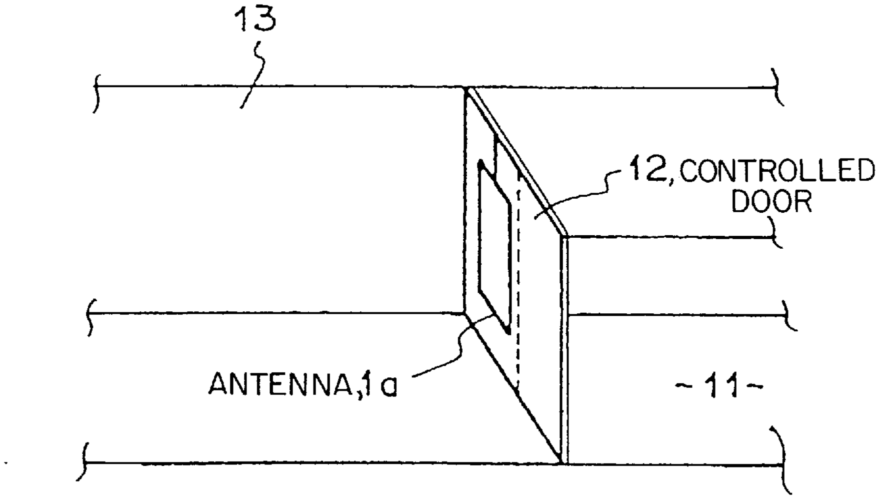
FIG. 3 is a perspective view showing another layout example of a wireless card reader at the side of a door of which opening/closing is controlled.

FIGS. 2 and 3 show equipment layout examples around the controlled door. FIG. 2 shows a case in which the wireless card reader 1 is provided on a wall 13 near a controlled door (equivalent to the gate 4 shown in FIG. 1) for entering into or leaving a security area (a room) 11. FIG. 3 shows a case in which the wireless card reader 1 was separated into a main body and a communication antenna 1*a* and the antenna 1*a* portion only was set on the controlled door 12 and the main body of the wireless card reader 1 was set at an optional place.

Figure 4:
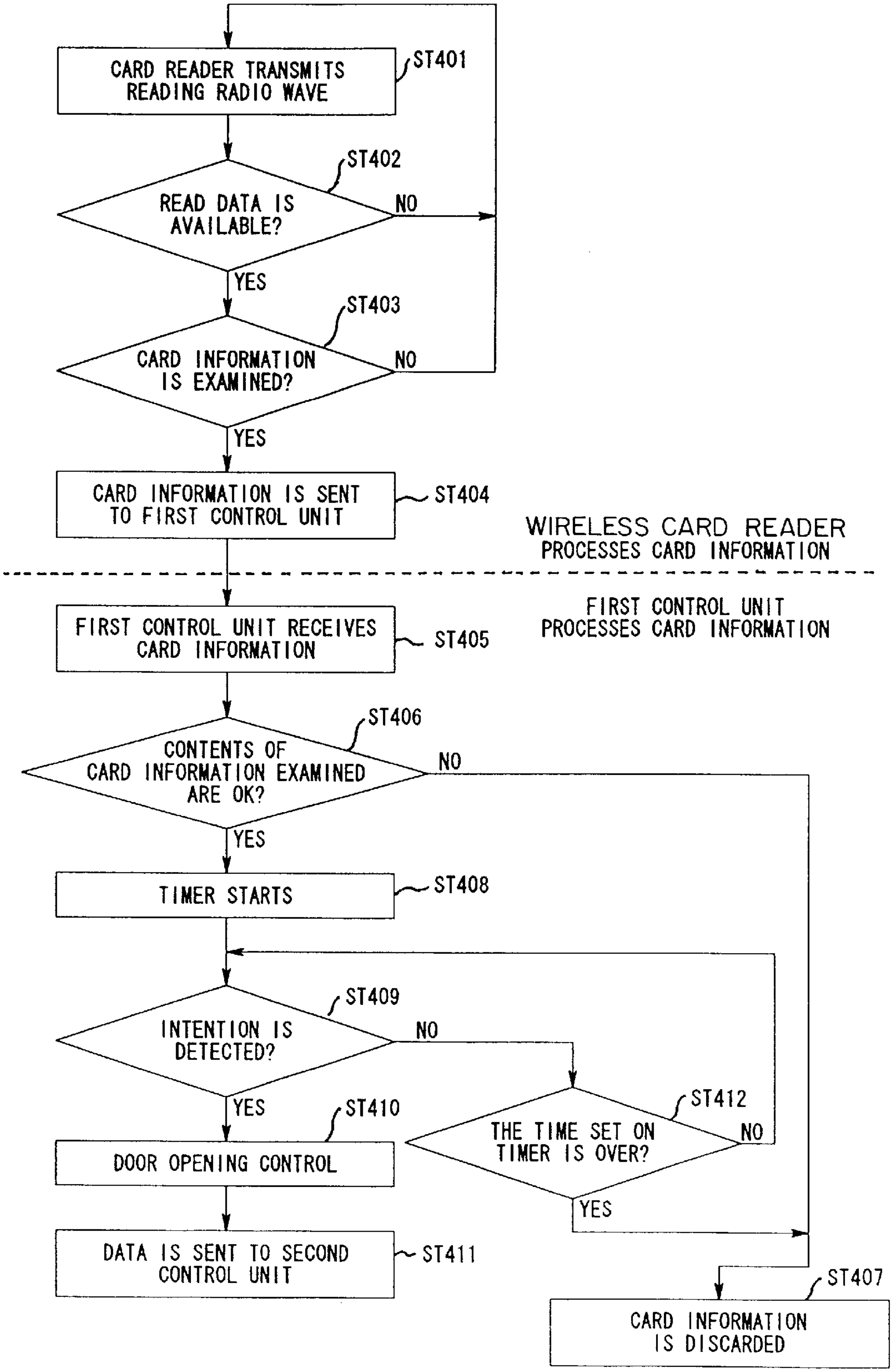
FIG. 4 is a flowchart for explaining the operation in a first embodiment of the entering/leaving control system of the present invention.

Next, the processing operation in the construction, as described above, will be explained referring to a flowchart shown in FIG. 4. In the first embodiment, the presence of the input for indicating the user's intention to enter/leave a room is judged through detecting the input by the intention detecting means and passing an indication of the input to the first control unit 3.

The wireless card reader 1 is constantly transmitting a radio wave for reading card information (ST401). If a wireless card P is present in the reading range of the wireless card reader 1 (ST402), that wireless card P transmits the pre-written collating information peculiar to the card. The wireless card reader 1 receives the card information (the collating information) and examines (judges) the card information to determine if it is properly received (ST403).

As a result of this examination, the card information is revealed to be properly received, the card information is sent to the first control unit 3 (ST404). The first control unit 3 receives the card information (ST405) and judges the entering/leaving authorization by examining the contents of the card information (ST406). That is, the collating information read from the wireless card P is collated with the collating information that has been preset and stored in the first control unit 3 and the entering/leaving authorization is judged according to whether a prescribed relation is formed between both sets of collating information.

If the result of the collation revealed that no prescribed relation was formed between both collating information, the entering/leaving authorization is judged to be unauthorized and the collating information read from the wireless card P is discarded (ST407). If the result of the collation revealed that the prescribed relation was formed between both collating information, the entering/leaving authorization is judged to be allowable, and a timer is started (ST408) for waiting for the intention indicating input from the intention detecting means 2.

If the user's intention indicating input is detected by the intention detecting means 2 before the timer completes the counting of a fixed time (ST409), it is regarded that the card for the user with the intention to enter/leave the room is read, room entering/leaving is finally judged OK, and a door opening control signal is output (ST410), and the room entering/leaving information at this time is sent to the second control unit 5 (ST411).

If no intention indicating input was detected by the intention detecting means 2 when the timer has counted a fixed time (ST412), it is judged that the user has no intention of room entering/leaving (ST607), the room entering/leaving is judged finally to be not allowed and the collating information read from a wireless card P is discarded (ST407). A fixed time that is counted by the timer is about 10–20 seconds.

Next, a second embodiment will be explained.

Figure 5:
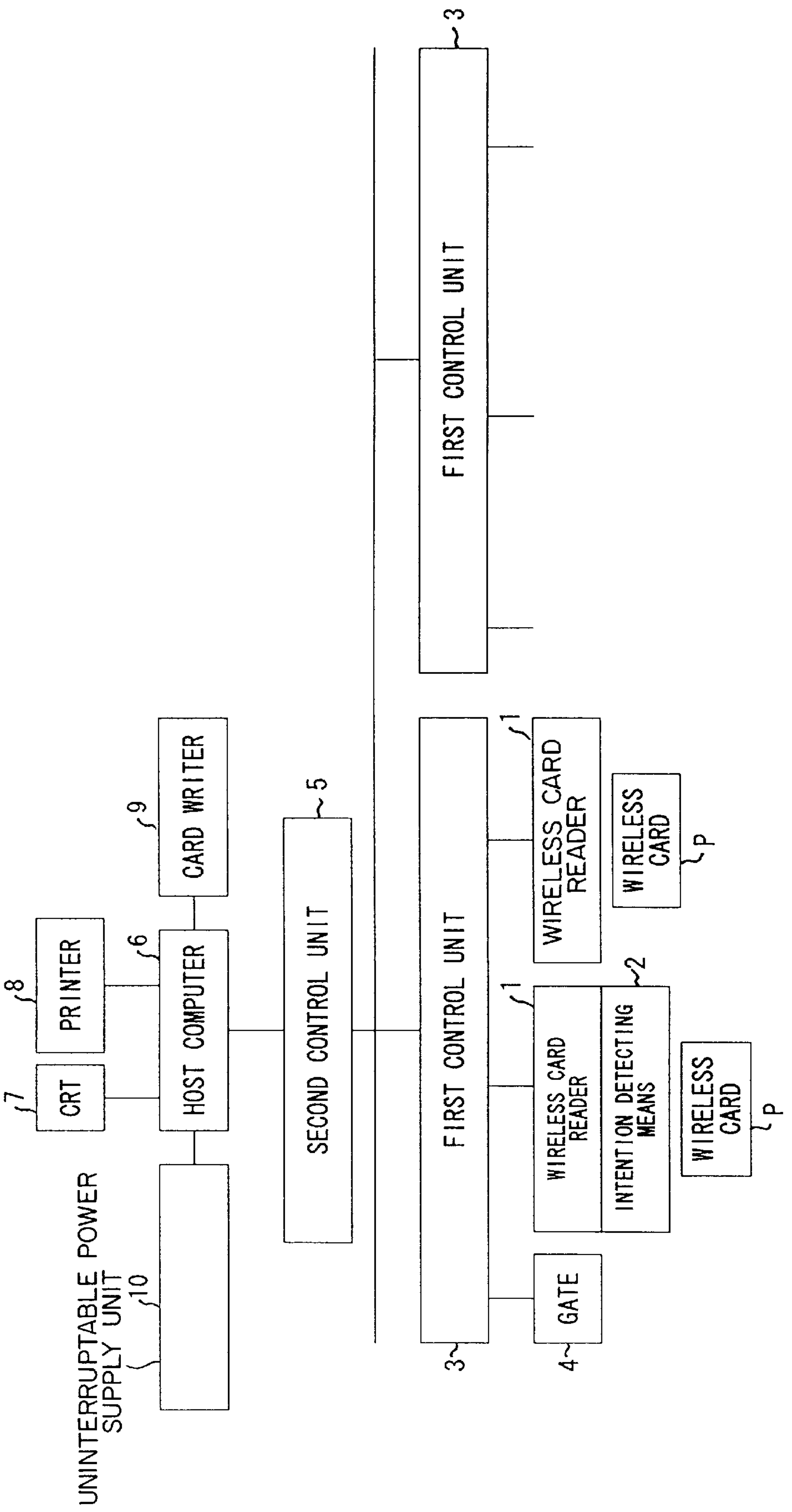
FIG. 5 is a schematic block diagram showing the construction of a second embodiment of the entering/leaving control system of the present invention.

FIG. 5 is a schematic block diagram showing the construction of a non-touch entering/leaving control system involved in the second embodiment. The second embodiment differs from the first embodiment shown in FIG. 1 in that the intention detecting means 2 has been connected to the wireless card reader 1 and all other aspects are identical to the first embodiment.

Figure 6:
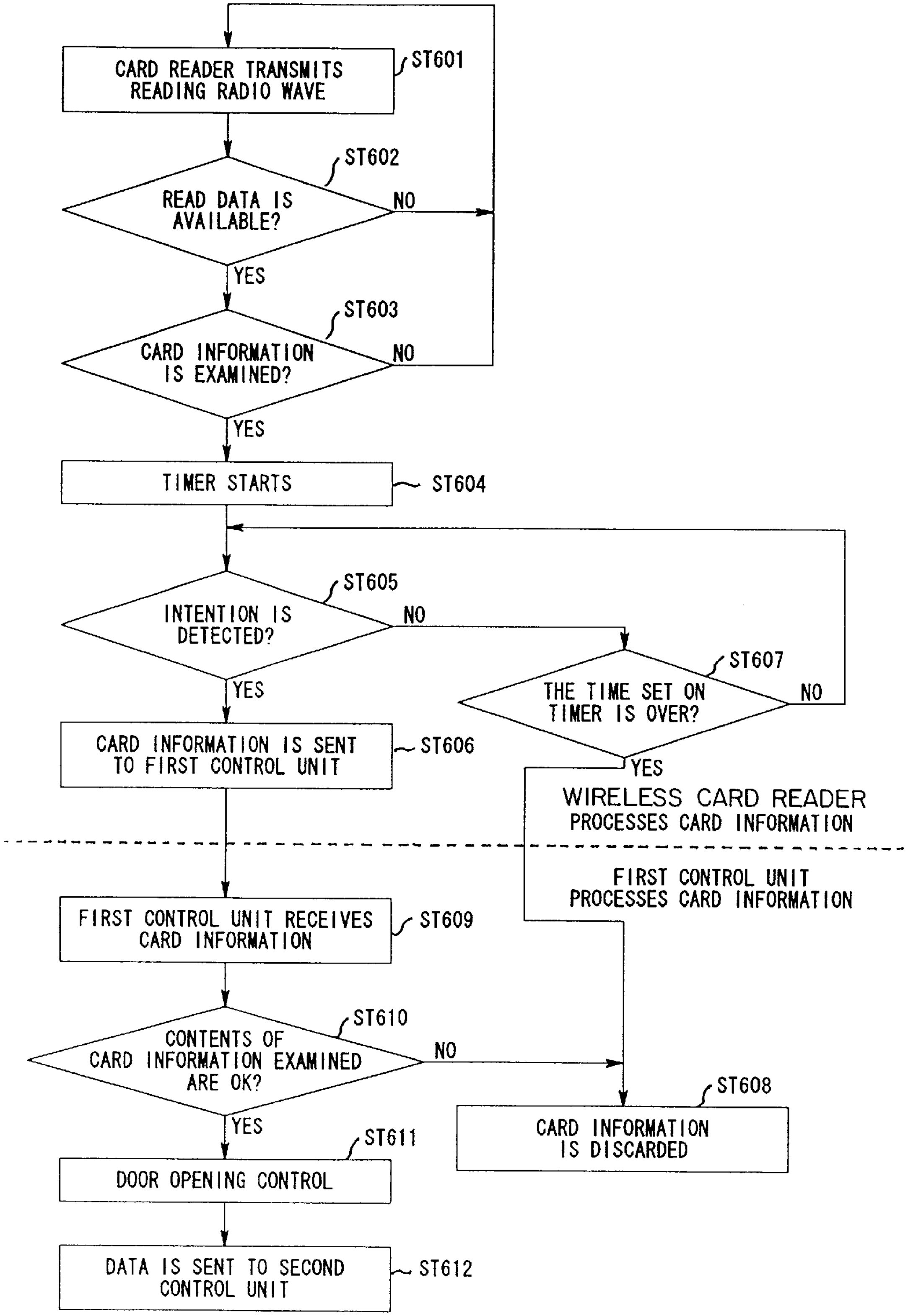
FIG. 6 is a flowchart for explaining the operation of the second embodiment of the entering/leaving control system of the present invention.

Hereinafter, the processing operation will be explained referring to a flowchart shown in FIG. 6. Further, in the second embodiment, the presence of the input for indicating user's intention to enter/leave the room is judged through the detection by the intention detecting means 2 in the wireless card reader 1.

The wireless card reader 1 is constantly transmitting a radio wave for reading card information (ST601). If a wireless card P is present in the reading range of the wireless card reader 1 (ST602), the wireless card P transmits the pre-written collating information peculiar to that card. The wireless card reader 1 receives this card information (the collating information) and examines (judges) the card information to determine if it is properly received (ST603).

If the result of this examination reveals that the card information is properly received, a timer is started (ST604) to wait for and the detection of the intention indicating input by the intention detecting means 2. If the input for indicating the user's intention is detected before the timer completes the counting of a fixed time (ST605), the card for the user with an intention to enter/leave a room is read and the card information is sent to the first control unit 3 (ST606).

If no intention indicating input is detected by the intention detecting means 2 when the counting of a fixed time has been completed by the timer (ST607), the card for the user with no intention to enter/leave the room and the collating information read from the wireless card P is discarded (ST608). The fixed time that is counted by the timer is about 10–20 seconds.

The first control unit 3 receives the card information from the wireless card reader 1 (ST609) and judges entering/leaving authorization as in the above by examining the contents of the card information (ST610). If the room entering/leaving is not allowable as a result of this judgment, the collating information read from the wireless card P is discarded (ST608). If the room entering/leaving is allowable as a result of the judgment, a door opening control signal is output (ST611) and the room entering/leaving information at this time is sent to the second control unit (ST612).

Next, a definite example of the intention detecting means 2 will be explained.

Figure 7:
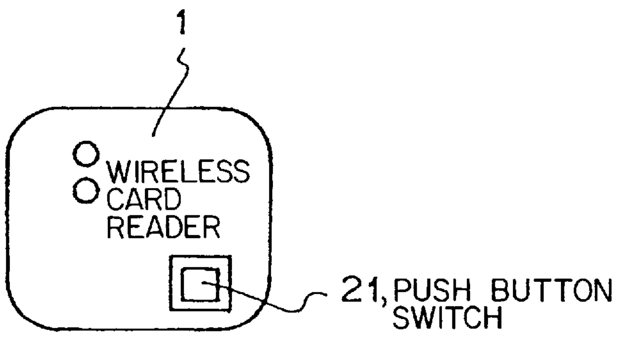
FIG. 7 is a plan view showing an embodiment using a push-button switch as an intention detecting means in the room entering/leaving control system of the present invention.

FIG. 7 shows a push-button switch 21 that is used as the intention detecting means 2 and is set on the wireless card reader 1. In this case, a user who has a room entering/leaving intention goes to near the controlled door 12 and after having the wireless card reader 1 read the carried wireless card P, indicates his intention to enter into/leave a room by depressing the push-button switch 21 within a fixed time.

Figure 8A:
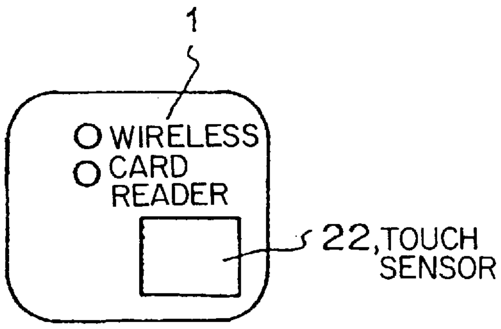
FIGS. 8A and 8B are plan views showing embodiments using a touch sensor as the intention detecting means.
Figure 8B:
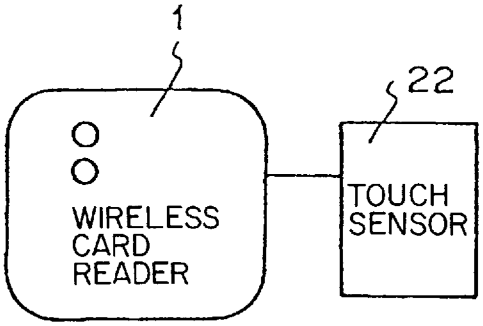

FIGS. 8A and 8B show a touch sensor 22 that is used as the intention detecting means 2 and is set on the wireless card reader 1 as in FIG. 8A or in the vicinity of the wireless card reader 1 as in FIG. 8B. In this case, a user who has a room entering/leaving intention goes to near the controlled door 12 and after having the wireless card reader 1 read the carried wireless card P, indicates his intention to enter into/leave a room by touching the touch sensor 22 with his elbow, etc. within a fixed time. Thus, it is possible to indicate his intention without any inconvenience when both hands are full.

Figure 9:
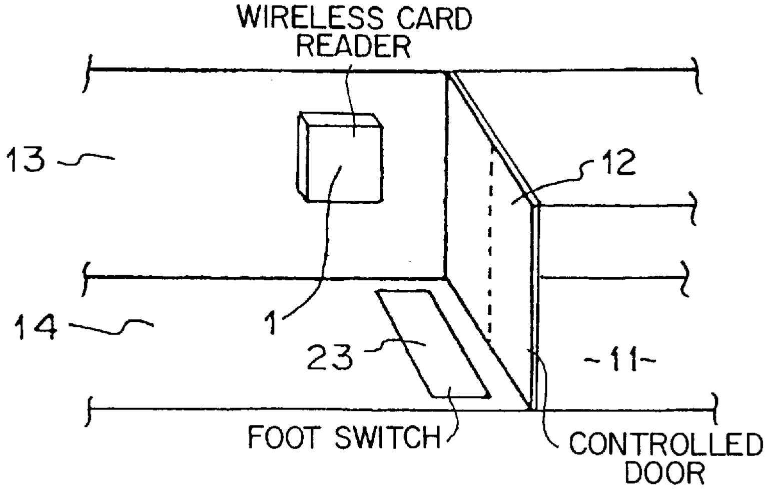
FIG. 9 is a perspective view showing an embodiment using a foot switch as the intention detecting means.

FIG. 9 shows a foot switch 23 that is used as the intention detecting means 2 and is set on a passage 14 in front of the controlled door 12. In this case, a user who has a room entering/leaving intention goes to near the controlled door 12 and has the wireless card reader 1 read the information stored in a carried wireless card P. Thereafter, he indicates his intention for a room entering/leaving by waiting in front of the door until the door opens naturally within a fixed time. Thus, it is possible to indicate his intention through the natural motion without any inconvenience when both hands are full. The fixed time in this case is about 2–3 seconds.

Figure 10:
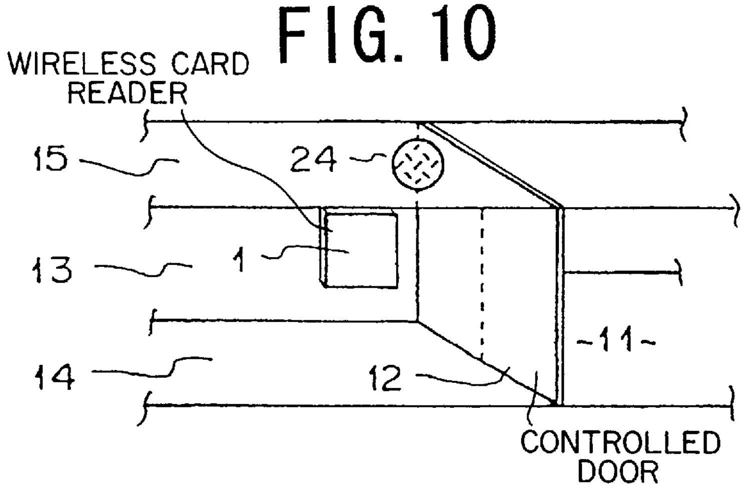
FIG. 10 is a perspective view showing an embodiment using a voice sensor as the intention detecting means.

FIG. 10 shows a voice sensor 24 that is used as the intention detecting means 2 and is set on a ceiling 15 in front of the controlled door 12. In this case, a specific voice signal is registered in the wireless card reader 1 and it is collated with a specific voice signal that is input through the voice sensor 24 and if both signals agree with each other, it is judged that the room entering/leaving is allowable.

In this case, a user who has a room entering/leaving intention goes to near the controlled door 12 and has the wireless card reader 1 read the information stored in a carried wireless card P. Thereafter, by speaking, for instance, a prescribed password to the voice sensor 24 within a fixed time, indicates his room entering/leaving intention. As s prescribed password in this case, for instance, a number of 4 figures and the like are used. Thus, the intention can be indicated through a natural motion without inconvenience even when both hands are full.

Figure 11:
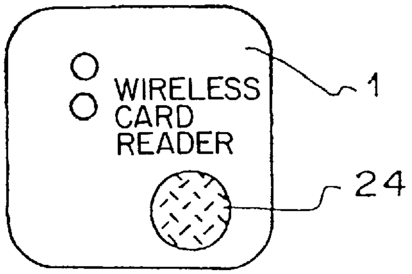
FIG. 11 is a plan view showing an embodiment wherein a voice sensor has been incorporated in a wireless card reader in one united body.

FIG. 11 shows a voice sensor 24 that is used as the intention detecting means 2 and is set on the wireless card reader 1. In this case, all other aspects are the same as in FIG. 10.

Next, a third embodiment will be explained.

Figure 12:
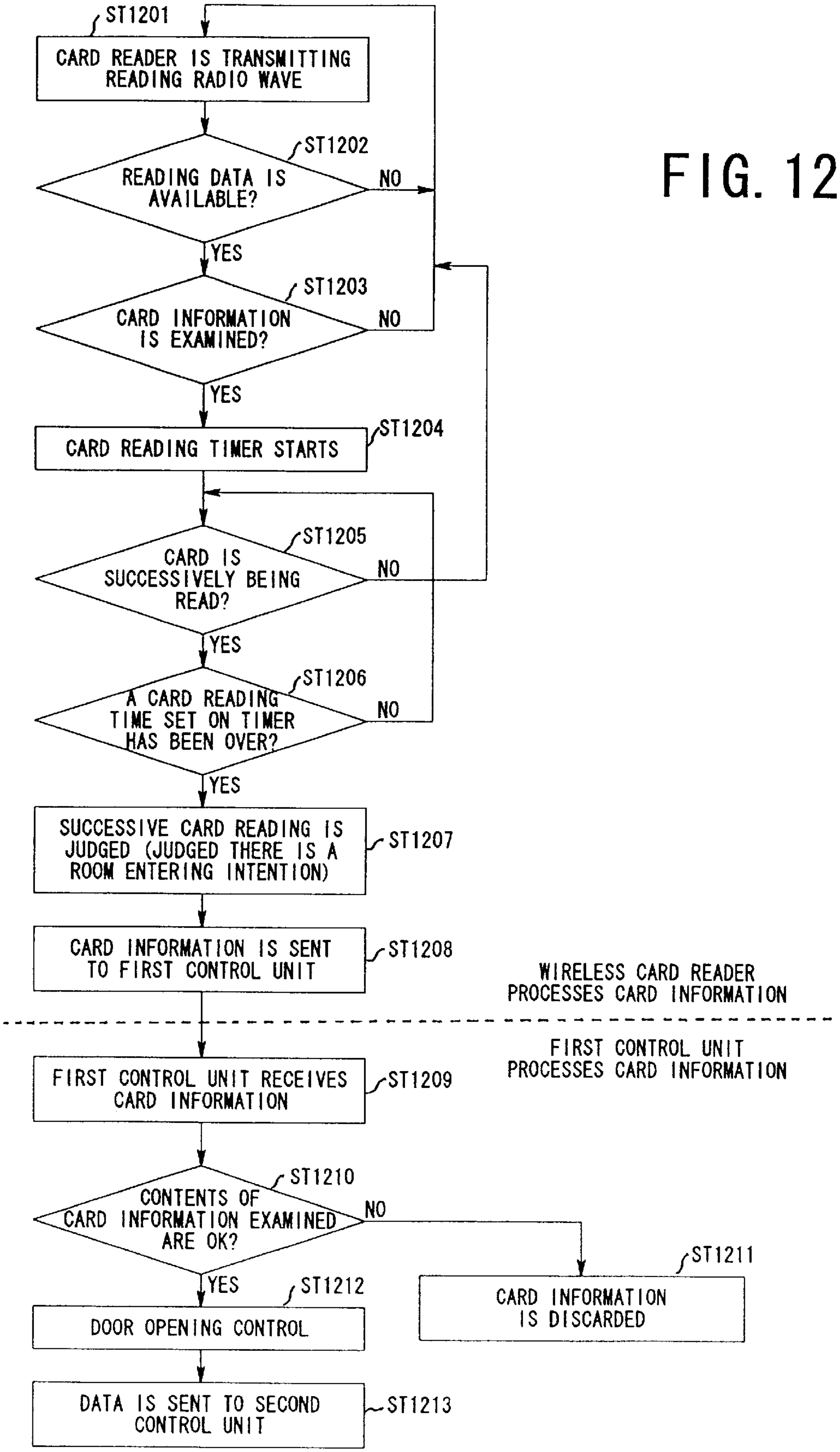
FIG. 12 is a flowchart for explaining the operation in a third embodiment of the entering/leaving control system of the present invention.

The third embodiment is to judge whether a user's room entering/leaving intention is indicated according to whether the same card information is successively read for a fixed time and the process operation will be explained in the following, referring to a flowchart shown in FIG. 12.

The wireless card reader 1 is constantly transmitting a radio wave for reading card information (ST1201). When a wireless card P is present in the reading range of the wireless card reader 1 (ST1202), that wireless card P transmits pre-written collating information peculiar to that card. The wireless card reader 1 receives the card information (collating information) and examines (judges) the card information to determine if it is properly received (ST1203).

The result of this examination reveals that the card information is properly received, the timer is started (ST1204) and by repeating the operation to read card information of the same wireless card P until a time set on a timer is over, judges whether the same card information is successively read for a fixed time (ST1205). If it is revealed that the same card information is read successively for a fixed time (ST1206), this indicates that a user carrying a wireless card P who has an intention for room entering/leaving is standing near the wireless card reader 1 in front of the controlled door, and it is therefore regarded that a card for a user with the room entering/leaving intention is read (ST1207) and the card information is sent to the first control unit 3 (ST1208). The fixed time described above is about 2–3 seconds.

The first control unit 3 receives card information from the wireless card reader 1 (ST1209) and judges enter/leaving authorization of the user for the room in the same manner as described above by examining the contents of the card information (ST1210). If room entering/leaving is not allowable as a result of this judgment, the collating information read from the wireless card P is discarded (ST1211). If the room entering/leaving is allowable, a door opening control signal is output (ST1212) and the card information is sent to the second control unit 5 (ST1213).

According to the third embodiment, the intention detecting means 2 for indicating the user's intention for the room entering/leaving as in the first and the second embodiments described above is unnecessary.

According to the embodiments described above, when the intention detecting means 2 is provided to the wireless card reader 1 or in the vicinity of it for indicating a user's intention to enter/leave a room and entering/leaving authorization is finally judged based on a combination of the output of the intention detecting means 2 and the judging result of the entering/leaving authorization, according to the collating information read from a wireless card P, it becomes possible to open the door of a room only for allowable persons. Thus ensuring smooth room entering/leaving control.

Accordingly, regardless of the environment of the non-touch wireless card reader 1 for reading collating information from a wireless card P and the environment of the building it becomes possible to solve a problem such that wireless cards P come into the reading range of the wireless card reader and the door is unnecessarily controlled.

As described above in detail, according to the present invention it is possible to provide an entering/leaving control system which is capable of preventing the unnecessary gate control resulting from reading of information of wireless media when the user has no intention to enter/leave a specified place.

What is claimed is:

1. An entering/leaving control system for users who are each carrying a wireless medium storing at least collating information and having a wireless communication function, comprising:

means, provided near a gate for entering/leaving a specified place, for receiving the collating information sent from the wireless medium;

means for detecting a presence of an input for indicating an intention of one of the users to enter/leave the specified place;

judging means for collating the collating information received by the receiving means with a preset collating information and judging an entering/leaving authorization for a specified place based on an output of the intention detecting means and a result of the collation; and means for controlling an opening and a closing of the gate based on a judging result of the judging means.

2. The system as claimed in claim 1, wherein the intention detecting means includes a switch provided near the gate, the switch being operated by the one of the users who has the intention to enter or leave the specified place.

3. The system as claimed in claim 1, wherein the intention detecting means includes a foot switch provided near the gate, the foot switch being stepped upon by the one of the users who has the intention to enter or leave the specified place.

4. The system as claimed in claim 1, wherein the intention detecting means includes a voice sensor provided near to the gate so as to detect a voice generated by the one of the users who has the intention to enter or leave the specified place.

5. The system as claimed in claim 1, further comprising:

means for counting a prescribed time from the collation until the input to the intention detecting means is received.

6. The entering/leaving control system as claimed in claim 5, further comprising:

means for discarding the collating information received by the receiving means when the intention detecting means does not detect the input before the counting means completes the counting of the prescribed time.

7. The entering/leaving control system as claimed in claim 2, wherein the switch is a touch sensor on the receiving means.

8. The entering/leaving control system as claimed in claim 2, wherein the switch is a touch sensor in a vicinity of the receiving means.

9. The entering/leaving control system as claimed in claim 2, wherein the switch is a push button.

10. The entering/leaving control system as claimed in claim 4, wherein the voice sensor is on the receiving means.

11. An entering/leaving control system for users who are each carrying a wireless medium storing at least collating information and having a wireless communication function, comprising:

means, provided near a gate for entering/leaving a specified place, for receiving the collating information sent from the wireless medium and judging whether the collating information is properly received;

means for detecting a presence of an input for indicating an intention of one of the users to enter or leave a specified place;

judging means for collating the received collating information with a preset collating information when the received collating information is properly received by the receiving means, and judging an entering/leaving authorization for the specified place based on an output of the intention detecting means and the collation result; and means for controlling an opening/closing of the gate based on a judging result of the judging means.

12. The system as claimed in claim 11, wherein the intention detecting means includes a switch provided near the gate, the switch being operated by the one of the users who has the intention to enter or leave the specified place.

13. The system as claimed in claim 11, wherein the intention detecting means includes a foot switch provided near the gate, the foot switch being stepped upon by the one of the users who has the intention to enter or leave the specified place.

14. The system as claimed in claim 11, wherein the intention detecting means includes a voice sensor provided near the gate so as to detect a voice generated by the one of the users who has the intention to enter or leave the specified place.

15. The system as claimed in claim 11, further comprising:

means for counting a prescribed time from the collation by the collating means until the input to the intention detecting means is received.

16. The system as claimed in claim 15, further comprising:

means for discarding the collating information when the intention detecting means does not detect the input before the counting means completes the counting of the prescribed time.

17. The entering/leaving control system as claimed in claim 12, wherein the switch is a touch sensor on the receiving means.

18. The entering/leaving control system as claimed in claim 12, wherein the switch is a touch sensor in a vicinity of the receiving means.

19. The entering/leaving control system as claimed in claim 12, wherein the switch is a push button.

20. The entering/leaving control system as claimed in claim 14, wherein the voice sensor is on the receiving means.

21. An entering/leaving control system for users who are each carrying a wireless medium storing at least collating information and having a wireless communication function, comprising:

means, provided near a gate for entering/leaving a specified place, for receiving the collating information sent from the wireless medium for judging whether the collating information is properly received, and for counting a prescribed time for successively receiving the collating information from the same wireless medium when the received collating information is successively properly received;

means for judging an entering/leaving authorization of one of the users for entering or leaving the specified place by collating the received collating information with a preset collating information when the collating information is received successively from the same wireless medium for the prescribed time as determined by the receiving means; and means for controlling an opening/closing of the gate based on a result of the judgment of the judging means.

* * * * *